US010284577B2

(12) United States Patent
Feng et al.

(10) Patent No.: US 10,284,577 B2
(45) Date of Patent: May 7, 2019

(54) METHOD AND APPARATUS FOR FILE IDENTIFICATION

(71) Applicant: iYuntian Co., Ltd., Beijing (CN)

(72) Inventors: Zhentan Feng, Beijing (CN); Deqiang Cao, Beijing (CN); Shuguang Xiong, Beijing (CN); Xiaobo Zhou, Beijing (CN); Xin Wang, Beijing (CN)

(73) Assignee: IYUNTIAN CO., LTD., Beijing (CN)

( * ) Notice: Subject to any disclaimer, the term of this patent is extended or adjusted under 35 U.S.C. 154(b) by 175 days.

(21) Appl. No.: 14/986,075

(22) Filed: Dec. 31, 2015

(65) Prior Publication Data
US 2016/0366158 A1     Dec. 15, 2016

(30) Foreign Application Priority Data

Jun. 15, 2015   (CN) .......................... 2015 1 0330423

(51) Int. Cl.
*H04L 29/06*     (2006.01)
(52) U.S. Cl.
CPC ........ *H04L 63/1416* (2013.01); *H04L 63/145* (2013.01); *H04L 63/20* (2013.01)
(58) Field of Classification Search
CPC ... H04L 63/14; H04L 63/145; H04L 63/1408; H04L 63/1416; H04L 63/1425;
(Continued)

(56) References Cited

U.S. PATENT DOCUMENTS 8,375,450 B1 *  2/2013  Oliver ................... G06F 21/564
                                                       726/24
8,769,683 B1 *  7/2014  Oliver ................... G06F 21/561
                                                       719/311
(Continued)

FOREIGN PATENT DOCUMENTS

CN     103473506 A    12/2013
CN     103870754 A     6/2014
(Continued)

OTHER PUBLICATIONS

S. Momina Tabish et al., Malware Detection using Statistical Analysis of Byte-Level File Content, Jun. 28, 2009, ACM, pp. 23-31.*

(Continued)

*Primary Examiner* — Kari L Schmidt
*Assistant Examiner* — Fahimeh Mohammadi
(74) *Attorney, Agent, or Firm* — Lathrop Gage LLP

(57) ABSTRACT

The present application discloses a method and an apparatus for file identification. The method for file identification comprises: determining a virus family of each malicious file sample in a plurality of the file samples resulting in a plurality of virus families; dividing the plurality of the virus families into at least one sample group based on a number of the malicious files belonging to each of the plurality of virus families; training the malicious file samples in each of the at least one sample group with a different training rule to obtain at least one file identification model; and determining, using the at least one identification model whether a file is a malicious file. The method for file identification of the present application may provide different identification models for various types of malicious files and thus improves the accuracy of the file identification.

16 Claims, 5 Drawing Sheets

(58) Field of Classification Search
CPC . H04L 63/1433; H04L 63/1441; G06F 21/56; G06F 21/566
See application file for complete search history.

(56) References Cited

U.S. PATENT DOCUMENTS

| | | | |
|---|---|---|---|
| 8,935,788 B1 | 1/2015 | Diao et al. | |
| 9,635,039 B1* | 4/2017 | Islam | H04L 63/1408 |
| 2002/0116628 A1* | 8/2002 | Vignoles | G06F 21/56 726/24 |
| 2008/0127336 A1* | 5/2008 | Sun | G06F 21/566 726/22 |
| 2009/0099988 A1* | 4/2009 | Stokes | G06F 15/16 706/20 |
| 2012/0030293 A1* | 2/2012 | Bobotek | G06Q 10/10 709/206 |
| 2012/0158626 A1* | 6/2012 | Zhu | G06F 21/56 706/13 |
| 2012/0204266 A1* | 8/2012 | Yoo | H04L 63/14 726/24 |
| 2012/0317644 A1* | 12/2012 | Kumar | G06F 21/552 726/24 |
| 2013/0291111 A1* | 10/2013 | Zhou | G06F 21/566 726/23 |
| 2014/0090061 A1 | 3/2014 | Avasarala et al. | |
| 2014/0189859 A1* | 7/2014 | Ramanan | G06F 21/56 726/22 |
| 2015/0242626 A1* | 8/2015 | Wang | G06F 21/577 726/23 |
| 2016/0012227 A1* | 1/2016 | Tuvell | G06F 21/56 726/23 |
| 2016/0050574 A1* | 2/2016 | Jover | H04W 68/00 370/252 |

FOREIGN PATENT DOCUMENTS

| | | |
|---|---|---|
| CN | 103914657 A | 7/2014 |
| JP | H05298277 A | 11/1993 |
| JP | 2010152751 A | 7/2010 |
| KR | 20100069135 A | 6/2010 |

OTHER PUBLICATIONS

Yanfang Ye et al., Automatic Malware Categorization Using Cluster Ensemble, Jul. 25-28, 2010, ACM, pp. 95-104.*

Ronghua Tian et al., An Automated Classification System Based on the Strings of Trojan and Virus Families, Feb. 2, 2010, IEEE, pp. 23-30.*

Saeed Nan et al., Automated Malware Classification based on Network Behavior, May 16, 2013, IEEE, pp. 642-647.*

Japanese Patent Application No. 2015-234041, Notification of Reasons for Rejection dated Nov. 15, 2016, with English translation—6 pages.

* cited by examiner

METHOD AND APPARATUS FOR FILE IDENTIFICATION

RELATED APPLICATION

This application claims priority to Chinese Patent Application Serial No. 201510330423.4, filed with the State Intellectual Property Office of P. R. China on Jun. 15, 2015, the entire contents of which are incorporated herein by reference.

TECHNICAL FIELD

The present application relates to the field of computer technology, particularly to computer security technology, and more particularly to a method and an apparatus for file identification.

BACKGROUND

Computer virus can be regarded as a special type of program which generally hides in various computer files, sneaks into users' computer systems without the users' knowledge and authorization, and illegally attacks the computer systems. In order to ensure the security of the user data, malicious files containing computer viruses must be identified and prevented from causing destruction.

In the prior art, malicious files are generally identified by training existing file samples with a single data mining method, and identifying an unknown file by using the obtained training models. However, with the development of computer technology, the number of file samples and thus the types of computer viruses are continuously increasing. This leads to the problems in the prior art: increased time for training the models and significantly decreased accuracy for identifying malicious files.

SUMMARY

In view of the defects and deficiencies in the prior art, a solution with improved concurrency and high identification accuracy is desired. The present application provides a method and an apparatus for file identification to achieve one or more of the above objectives.

In a first aspect, a method for file identification provided in the present application comprises determining a virus family of each malicious file sample in a plurality of file samples resulting in a plurality of virus families; dividing the plurality of virus families into at least one sample group based on a number of the malicious files samples belonging to each of the virus families; training the malicious file samples in each of the at least one sample group with a different training rule to obtain at least one file identification model; and determining, using the at least one identification model, whether a file is a malicious file.

In a second aspect, an apparatus for file identification provided in the present application comprises: a determining module configured to determine a virus family of each malicious file sample in a plurality of file samples resulting in a plurality of virus families; a grouping module configured to divide the plurality of virus families into at least one sample group based on a number of the malicious file samples belonging to each of the plurality of virus families; a training module configured to train the malicious file samples in each of the at least sample group with a different training rule to obtain at least one file identification model; and an identifying module configured to determine, using the at least one identification model, whether a file to be identified is a malicious file.

In the method and the apparatus for file identification provided in the present application, the malicious files samples are assigned to groups according to the distribution of the malicious file samples in the virus families. Then, the samples in each group are trained to obtain different identification models. Finally, the plurality of identification models are used for performing the file identification simultaneously. By training the file samples with different sample distributions in different groups, the training time for obtaining the models may be decreased and the accuracy of the models for identifying malicious files may be improved.

BRIEF DESCRIPTION OF THE DRAWINGS

Other features, purposes, and advantages of the present application will become more apparent by reference to the detailed description of the non-limiting embodiments taken in conjunction with the accompanying drawings, wherein.

DETAILED DESCRIPTION

Figure 1:
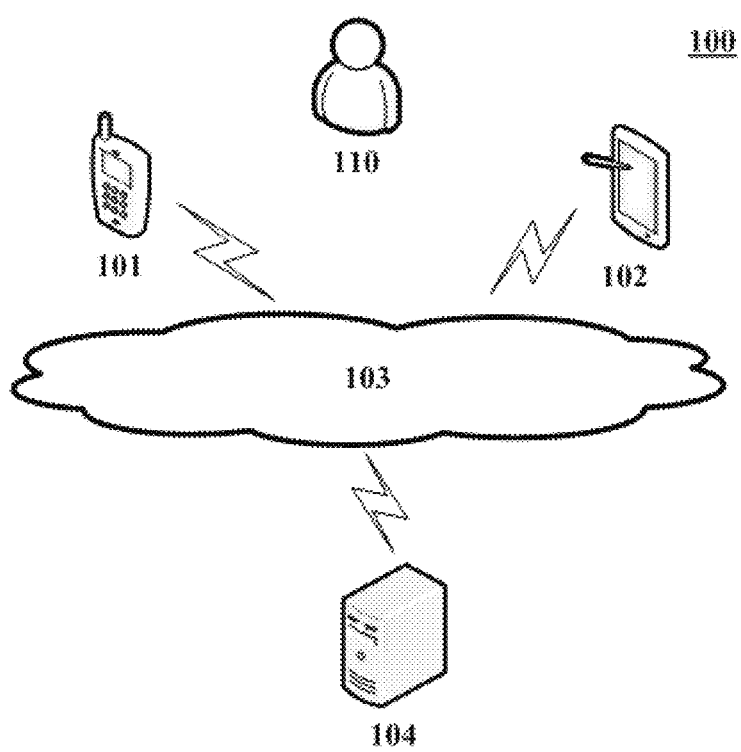
FIG. 1 illustrates an exemplary system architecture which may be used by embodiments of the present application.

Hereinafter, the embodiments of the present application will be described in conjunction with the accompanying drawings. It should be understood that the specific embodiments are merely used for illustrating the related inventions, without making limitations thereto. Further, to facilitate description of the invention, only portions related to the invention are shown in the drawings.

Moreover, the embodiments in the present application, as well as the features in the embodiments, may be combined with each other if there is no conflict. Hereinafter, the present application will be described in details according to the accompanying drawings in conjunction with the embodiments.

FIG. 1 illustrates an exemplary system architecture 100 which may be used by the embodiments of the present application.

As shown in FIG. 1, the system 100 may comprise terminal devices 101, 102, a network 103, and a server 104. The network 103 is used for providing a medium for communication links between the terminal devices 101, 102 and the server 104. The network 103 may include various types of connections, such as a wired or wireless network link, or a fiber-optic cable.

A user 110 may interact with the server 104 using the terminal devices 101, 102 via the network 103 to receive or send messages. Various communication client applications, such as instant messaging tools, mailbox clients, social networking software, may be installed on the terminal devices 101, 102.

The terminal devices 101, 102 may be various electronic devices including, but not limited to, personal computers, smart-phones, tablets or personal digital assistants.

The sever 104 may be a server providing various services. The server may process the received data (for example, store and/or analyze the received data), and providing feedback regarding the processing results to the terminal devices.

It is noted that the method for file identification provided in the embodiments of the present application may be implemented in the terminal devices 101, 102, or in the server 104. Further, the file identification apparatus may be provided in the terminal devices 101, 102, or in the server 104. In some embodiments, file identifying models may be trained in the server 104 and then stored in the terminals devices 101 and 102 for identifying malicious files. For example, if the network 103 flows smoothly when the file identification is performed, the server 104 may identify the file as malicious or non-malicious, and return the result; if no network is available or the network 103 is spotty, the file may be identified by the terminal devices 101, 102 directly whether it is a malicious file.

It should be appreciated that the numbers of the terminal devices, the network and the server as shown in FIG. 1 are merely illustrative and may be any number in response to actual requirement.

Figure 2:
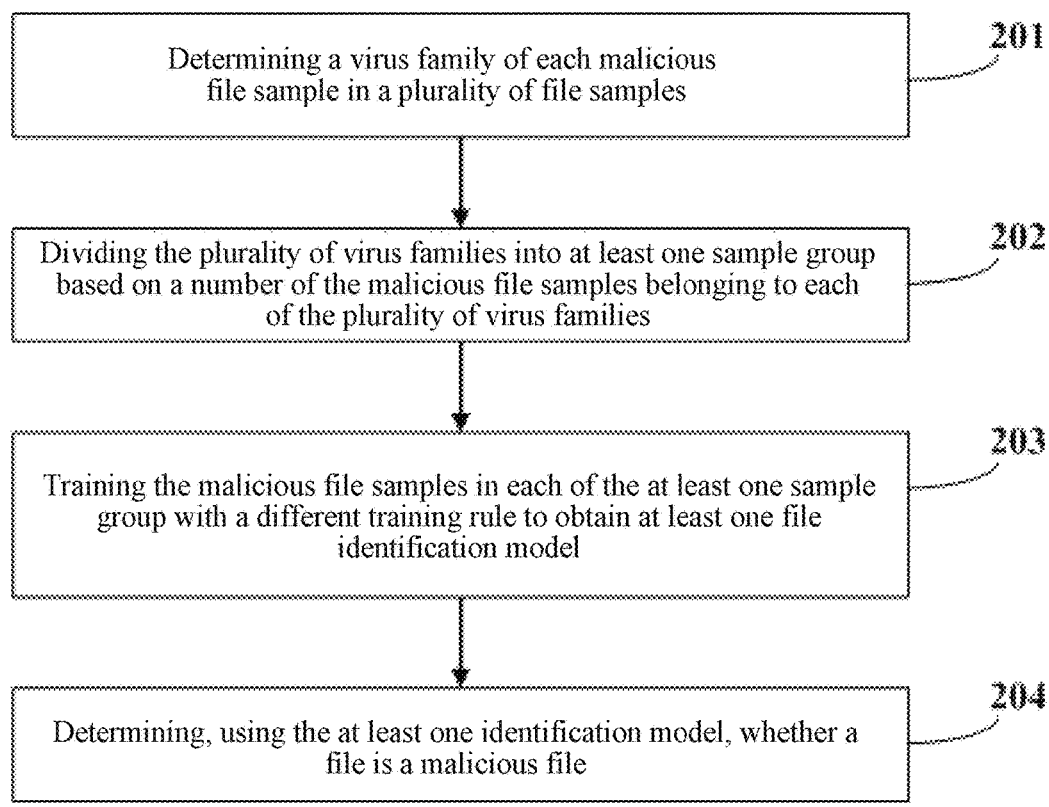
FIG. 2 illustrates an exemplary flow chart of a method for file identification according to an embodiment of the present application.

FIG. 2 illustrates an exemplary flow chart of the method for file identification according to an embodiment of the present application.

As shown in FIG. 2, virus families of the malicious file samples in the file samples are determined at step 201.

In this embodiment, the server or terminal device may obtain file samples for training and then determine a virus family to which each malicious file sample in the file samples belongs. The file samples may include a plurality of malicious file samples and a plurality of non-malicious file samples. A non-malicious file sample may be a file marked by the user as non-malicious, a file frequently used by the user, a file sent by a far-end terminal frequently interacting with the user and a non-malicious file stored in the network database, etc. A malicious file sample may be a file reported by the user as malicious and a malicious file stored in the network database, etc.

The virus family to which each malicious file sample belongs can be determined, as each malicious file sample may conceal the computer virus. In the prior art, the computer virus can be classified and named according to its properties in a general format of: <virus prefix>.<virus name>.<virus postfix>. The virus prefix refers to the genus of the virus for distinguishing its genus and species. For example, the prefix of a Trojan virus is Trojan and that of a worm is Worm, etc. A virus name indicates a family characteristic of a virus for distinguishing and identifying a virus family. For example, the family name of a Sasser worm is "Sasser". A virus postfix indicates a characteristic of a virus variant for distinguishing a certain variant of a virus family, which is generally represented by one of the 26 English letters. For example, Worm.Sasser.b means a variant B of a Sasser worm. Accordingly, <virus prefix>.<virus name> can be considered as a virus family in the embodiment. For example, the Worm.Sasser may be considered as a virus family of Sasser worm. The virus family of a malicious file sample can be determined based on the computer virus contained in the malicious file sample.

Subsequently, at step 202, the virus families are assigned to at least one sample group based on the number of the malicious files belonging to each of the virus families.

After the virus family of each malicious file sample is determined at step 201, a given virus family is likely to include a plurality of malicious file samples. At step 202, the number of malicious samples in each virus family is counted and the virus families are assigned to groups according to the counted number of malicious samples to obtain at least one sample group. For example, a threshold value may be preset. A virus family having a number of the malicious samples which is larger than the threshold value is assigned to a first sample group, otherwise to a second sample group.

Figure 3:
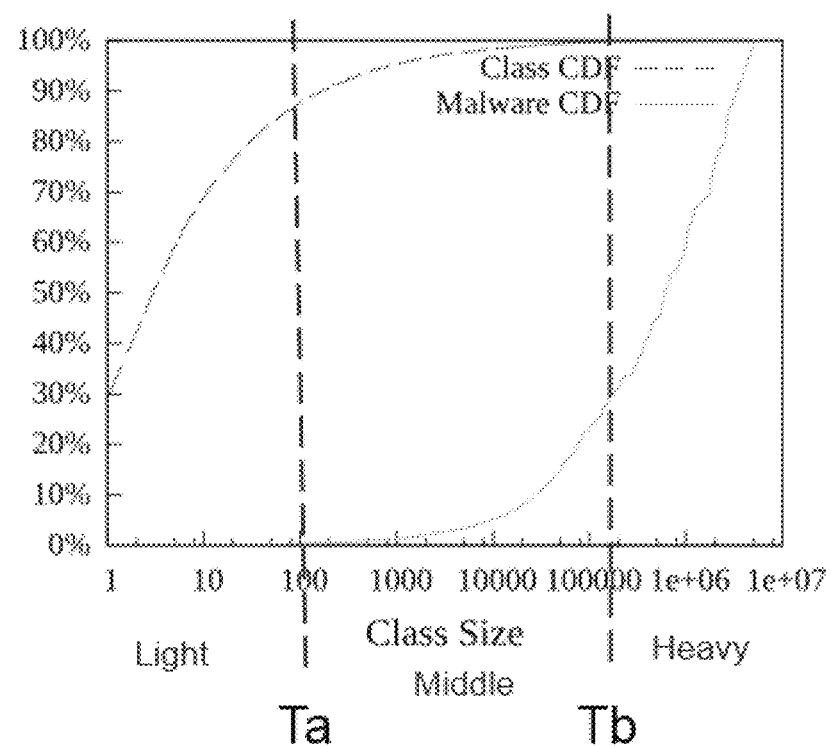
FIG. 3 illustrates an exemplary diagram of a cumulative distribution function of a virus family according to the present application.

In an optional implementation of the present embodiment, the sample group may include a light-class sample group, a middle-class sample group and a heavy-class sample group. Particularly, two threshold values Ta and Tb (Ta<Tb) are set. Then, the virus families having malicious samples less than Ta are assigned to the light-class sample group, the virus families having malicious samples more than Tb are assigned to the heavy-class sample group, and others are assigned to the middle-class sample group. Optionally, the specific values of Ta and Tb may be determined based on the CDF (cumulative distribution function) of the virus family. FIG. 3 illustrates an exemplary diagram of the cumulative distribution function of the virus family according to the present embodiment, wherein the solid line represents the CDF of the number of the malicious file samples, i.e., a malware CDF curve; and the stitched line represents the CDF of the number of the virus families, i.e., a class CDF curve; and the abscissa Class Size represents the number of the malicious file samples in the virus families. It can be seen from FIG. 3 that there are many types of virus families in the light-class sample group, but the proportion of the malicious files in the light-class sample group in all the malicious file samples is small. In contrast, the heavy-class sample group includes fewer number of virus families, but has a large proportion of the malicious files in all the malicious file samples. The middle-class sample group is the case in between.

Subsequently at step 203, the malicious file samples in each sample group are trained with different training rules to obtain at least one file identification model.

In the embodiment, since the at least one sample group obtained in step 202 is divided based on the distribution of the malicious file samples in the virus families, the malicious file samples in different sample groups have different distribution characteristics. When the identification models are trained, the sample groups may be trained with different training rules separately so that the trained models are better aligned with the characteristics of the corresponding sample group, thereby the identification accuracy of the file identification model being improved. The concrete training rules may be selected by the user based on the characteristics of the sample group. Training samples used in the training may be the malicious file samples in the sample group and a group of fixed non-malicious file samples.

In an optional implementation of the present embodiment, feature vector training may be performed to the malicious file samples in the light-class sample group and a group of non-malicious file samples to obtain a light-class file identification model. Since there are numerous types of virus families in the light-class sample group but with a small proportion of the total malicious files in all the malicious file samples, the samples may be trained using a method expressing a traditional feature library. Specifically, features may be extracted from the malicious file samples and the non-malicious file samples to obtain their feature vectors; and then all the file samples are trained by supervised learning to obtain the light-class file identification model.

In an optional implementation of the present embodiment, logic operation training may be performed on the malicious file samples in the middle-class sample group and a group of the non-malicious file samples to obtain a middle-class file identification model. The samples in the middle-class sample group may be trained with the method of logic operation since the proportion of the virus families is close to the proportion of the malicious files in all the malicious file samples. In one embodiment, one or more features may be used for matching with the malicious file samples and the non-malicious file samples to obtain the matching result of each feature. The logic operation training is then performed to the result of each feature to determine a specified feature and a trained logic expression. Thus, a middle-class file identification model is obtained.

In an optional implementation of the present embodiment, the malicious file samples in the heavy-class sample group and a group of the non-malicious file samples may be combinatorially trained with a plurality of sub-models, and the set of the sub-models is used as a heavy-class file identification model. Since the types of the virus families are relatively few, while the proportion of the malicious files in all the malicious file samples is large, the plurality of sub-models can be trained simultaneously and the set of the sub-models can be used as the heavy-class file identification model. When a heavy-class file identification model is used to identify a file to be identified, a plurality of sub-models may be used to judge the file to be identified and the plurality of results are considered in combination for determining whether the file to be identified is a malicious file. Thus, the accuracy for identifying malicious files is improved.

It is noted that, for each of the above three training methods, the input to the model is a feature extracted according to the contents of the file samples, including, but not limited to, a 4-byte character feature of the file content, i.e., a binary character string having a length of 4 bytes.

Finally, at step 204, it is determined by at least one identification model whether the file to be identified is a malicious file.

After one or more file identification models are obtained in the step 203, the identification models may be used to determine whether the file to be identified is a malicious file. In one embodiment, if there is only one identification model, the file to be identified is determined as a malicious file according to the identification result of the file identification model. If there are a plurality of identification models, all of the identification models are used simultaneously to judge the file to be identified. The file is determined as a malicious file as long as it is determined to be malicious by one of the identification models.

In the file identification method provided in the above embodiment, the malicious file samples are first assigned to groups according to the distribution of the malicious file samples in the virus families. Then, the samples in each group are trained to obtain different identification models. In one embodiment, the plurality of identification models may be used for performing the file identification simultaneously. By training the file samples having different sample distributions in different groups, the training time of the models is decreased and the accuracy of the models for identifying malicious files is improved.

Figure 4:
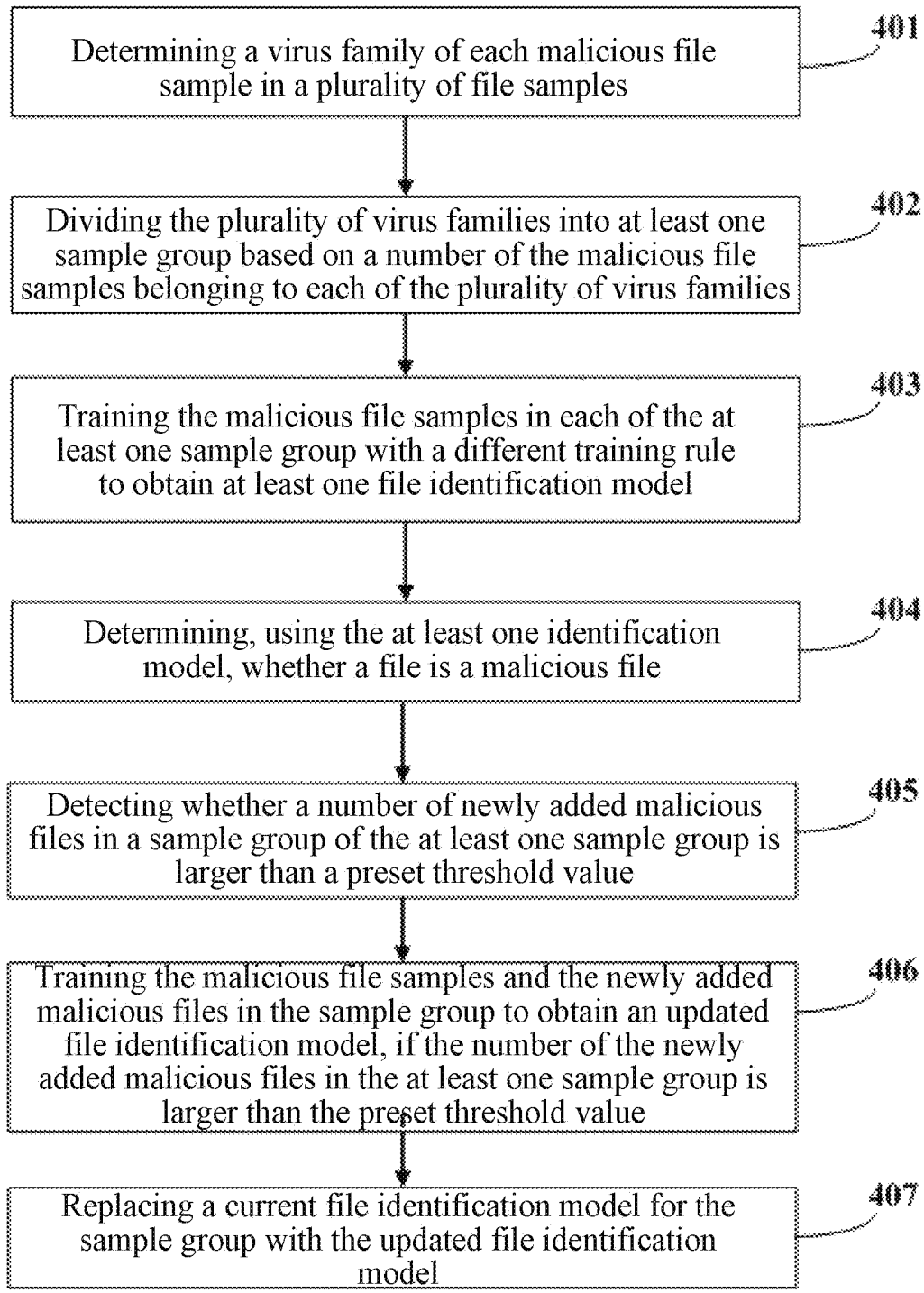
FIG. 4 illustrates an exemplary flow chart of a method for file identification according to another embodiment of the present application.

Further referring to FIG. 4, an exemplary flow chart of the method for file identification according to another implementation of the present application is illustrated.

As shown in FIG. 4, the virus family to which each malicious file sample in the file samples belongs is determined at step 401.

Subsequently at step 402, the virus families are assigned to at least one sample group based on the number of the malicious file samples in each of the virus families.

Next, at step 403, the malicious file samples in each sample group are trained by using different training rules to obtain at least one file identification model.

Subsequently, at step 404, it is determined by the at least one of file identification model whether a file to be identified is a malicious file.

In the present embodiment, the steps 401 to 404 described above are identical to the steps 201 to 204 in FIG. 2, and are therefore not repeatedly described here.

Subsequently, it is detected whether the number of malicious files newly added in a sample group is above a preset threshold value at step 405.

In this embodiment, if a file to be identified is determined as a malicious file in the step 404 as described above, its virus family may be further determined and the file may be regarded as a newly added malicious file to the sample group to which the virus family belongs. The terminal device or the server may detect the number of the newly added malicious files in each sample group at a predetermined frequency such as once per day and compare the number with a preset threshold value, which may be a specific number of the additional malicious files, e.g. 50 or a proportion of the additional malicious files in all original malicious files, e.g. 15%. If the number of the additional malicious files is larger than the preset threshold value, it can be considered that a large number of malicious files are added into the sample group and thus the current model may be unable to satisfy the identification requirement. In this case, the current model should be updated in below step 406.

Subsequently at step 406, if the number of the additional malicious files in the group is above the preset threshold value, the malicious file samples and the added malicious files in the sample group are trained to obtain an updated file identification model.

In one embodiment, if it is detected that the number of additional malicious files in a sample group is larger than the preset threshold value in the step 405 as described above, the file identification model corresponding to this sample group may be updated. In another embodiment, the previous malicious file samples and the newly detected additional malicious files may be considered as the malicious file samples in the training samples and trained after a group of non-malicious file samples are added, so that the updated file identification model is obtained. It is noted that the training rules used in this step may be the same rules that are used for training the same sample group in step 403.

Finally, the current file identification model of the sample group is replaced by the updated file identification model at step 407.

The current file identification model of the sample group may be automatically replaced by the updated file identification model after the latter is obtained. In one embodiment, if the current file identification model is a model implemented on-line in real time, the updated file identification model may be published automatically to the on-line system.

In an optional implementation of the present embodiment, before the current file identification model is replaced by the updated file identification model, the method for file identification according to the present application may further comprise: evaluating the updated file identification model and the current file identification model based on the file samples to obtain a first evaluating result and a second evaluating result; evaluating the updated file identification model based on the files added in a preset period to obtain a third evaluating result; and performing the replacement described above if the first evaluating result is superior to the second evaluating result, and the third evaluating result satisfies a preset condition.

Particularly, the updated file identification model and the current file identification model may be evaluated respectively by using the file samples used in the step 401 after the updated file identification model is obtained. That is, the above files may be identified by using the updated file identification model and the current file identification model respectively, so that the first evaluating result and the second evaluating result are obtained. The advantages and disadvantages of the updated file identification model and the current file identification model may be evaluated based on the first evaluating result and the second evaluating result as the testing samples used in this step are the original file samples.

Meanwhile, the files added in the preset period, for example, all of the malicious files and non-malicious files added in the last three days, may be used to evaluate the updated file identification model. That is, the recently added files may be identified by the updated file identification model to obtain the third evaluating result. Since the testing samples used in this step are the recently added file samples, the third evaluating result may be used for determining whether the updated file identification model satisfies the identification requirement for the added files.

The replacement described above may be executed if the first evaluating result is superior to the second evaluating result and the third evaluating result satisfies the preset condition. Optionally, the evaluating result may comprise a detection rate and/or false positive rate, wherein the detection rate refers to the proportion of the identified malicious files in all the malicious files, and the false positive rate is the proportion of the falsely identified files in all files. The two parameters are important indicators for measuring the merits of the identification models. High detection rate and low false positive rate are desired. When the first evaluating result is superior to the second evaluating result, i.e., the updated file identification models has a higher detection rate and a lower false positive rate to the original file identifications than the current file identification model, the identification effect of the updated file identification model is better than that of the current model. If the third evaluating result satisfies the preset condition, for example, the detection rate is larger than 80% and the false positive rate is smaller than 0.02%, the identification effect of updated file identification model satisfies the identification requirement of the newly added files. If the updated file identification model simultaneously satisfies the above two requirements, the current identification model may be replaced by the updated file identification model. In the present embodiment, the identification effect of the latest model is further inspected before the latest model is used, to ensure that the updated model is superior to the current model and satisfies the latest use requirements.

As compared to the embodiment shown in FIG. 2, in the present embodiment, when the newly added malicious files in a sample group is up to a certain number, the identification model corresponding to the sample group may be updated automatically without processing the other models so that the model may be updated quickly, and the concurrency of the file identification model is ensured.

It should be noted that, although the operations of the present invention are described in a specific sequence in the drawings, it is not required or implied that the operations must be performed in the sequence or all the operations must be implemented to achieve the desired result. On the contrary, the operation sequence of the steps described in the flow chart may be changed. Additionally or alternatively, some of the steps may be omitted; a plurality of steps may be combined into one step and/or one step may be assigned to a plurality of steps.

Figure 5:
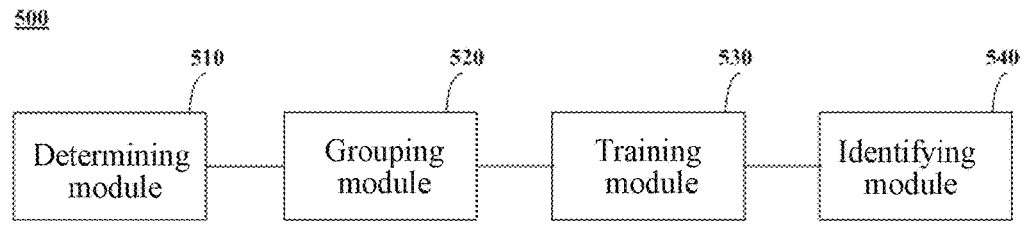
FIG. 5 illustrates a structural diagram of an apparatus for file identification according to embodiments in the present application.

FIG. 5 illustrates a structural diagram of the apparatus for file identification according to embodiments in the present application.

As shown in FIG. 5, the file identification apparatus 500 may comprise a determining module 510, a grouping module 520, a training module 530 and an identifying module 540.

The determining module 510 is configured to determine the virus family to which each malicious file sample in the file samples belongs.

The grouping module 520 is configured to divide the virus families into at least one sample group based on the number of the malicious file samples in each of the virus families.

The training module 530 is configured to train the malicious file samples in the at least one sample group by using different training rules to obtain at least one file identification model.

The identifying module 540 is configured to determine whether a file to be identified is a malicious file by using the file identification model.

In an optional implementation of the present embodiment, the sample group includes a light-class sample group, a middle-class sample group and a heavy-class sample group.

In an optional implementation of the present embodiment, the training module 530 includes a first training unit, a second training unit and a third training unit.

The first training unit is configured to perform a feature vector training to the malicious file samples in the light-class sample group and a set of non-malicious files to obtain a light-class file identification model.

The second training unit is configured to perform logic operation training to the malicious file samples in the middle-class sample group and a group of non-malicious file samples to obtain a middle-class file identification model.

The third training unit is configured to perform a combinatorial training to the malicious file samples in the heavy-class sample group and a set of non-malicious files, in which a set of the sub-models is considered as a heavy-class file identifications model.

In an optional implementation of the present embodiment, the file identification apparatus 500 further comprises a detecting module, an updating module and a replacing module.

The detecting module is configured to detect whether the number of the newly added malicious in the sample group is larger than the preset threshold value.

The updating module is configured to train the malicious file samples in the sample group and the newly added malicious files to obtain the updated file identification model, if the number of the newly added malicious files is larger than the preset threshold value.

The replacing module is configured to replace the current file identification model for the sample group with the updated file identification model.

In an optional implementation of the present embodiment, the file identification apparatus 500 further comprises a first evaluating module and a second evaluating module.

The first evaluating module is configured to evaluate the updated file identification model and the current file identification model based on the file samples to obtain the first evaluating result and the second evaluating result, respectively.

The second evaluating module is configured to evaluate the updated file identification model based on the newly added files in the predetermined period to obtain the third evaluating result.

The replacing module as described above is further configured to replace the current file identification model with the updated file identification model if the first evaluating result is superior to the second evaluating result and the third evaluating result satisfies the preset condition.

The evaluating result includes the detection rate and/or the false positive rate.

It should be appreciated that the modules or units in apparatus 500 are corresponded to the steps described in FIG. 2 and FIG. 4. The operation and features as described above for the method of file identification are also applicable to apparatus 500 and the modules thereof, and therefore not repeated here. The modules or the units in apparatus 500 may cooperate with the corresponding modules or units in the terminal devices and/or the servers to realize the solution of the embodiments of the present application.

The file identification apparatus provided in the above embodiment assigns first the malicious files samples to the groups based on the distribution of the malicious file samples in the virus families. Then, the samples in each group are trained separately to obtain the different identification models. Finally, a plurality of the identification models are used to identify the files concurrently. By training the file samples having different sample distributions in different groups, not only the training time of the models can be decreased and but also the accuracy of the models for identifying malicious files can be improved.

Figure 6:
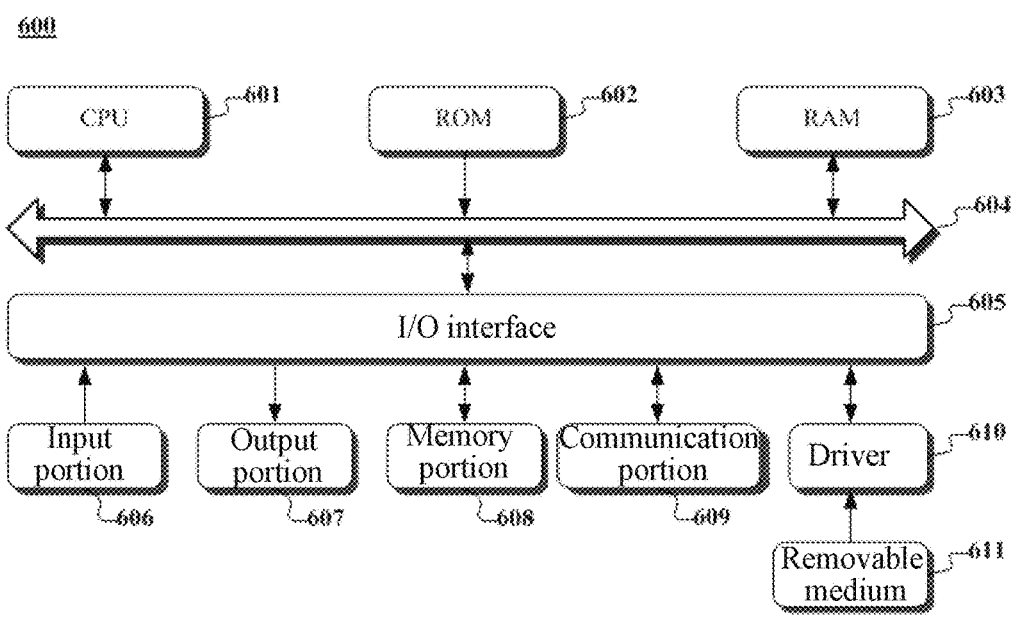
FIG. 6 illustrates a structural diagram of a computer system adapted for implementing a terminal device or a server of embodiments in the present application.

FIG. 6 illustrates a structural diagram of a computer system 600 adapted for implementing the terminal device or the server of embodiments in the present application.

As shown in FIG. 6, the computer system 600 includes a central processing unit (CPU) 601 which can perform various appropriate actions and processes according to programs stored in a read only memory (ROM) 602 or loaded from a memory portion 608 to a random access memory (RAM) 603. Various programs and data needed by the computer system 600 for its operation are also stored in the RAM 603. The CPU 601, the ROM 602 and the RAM 603 are connected to each other through a bus 604. Input/output (I/O) interfaces 605 are also connected to the bus 604.

Following parts are connected to I/O interfaces 605: an input part 606 including a keyboard, a mouse etc., an output part 607 including a cathode ray tube (CRT), a liquid crystal display (LCD), a memory part 608 including hard disks etc., and a communication part 609 including network interface cards such as a LAN card, and a modem. The communication part 609 handles communication process through a network such as the Internet. A driver 610 may also be connected to the I/O interfaces 605 as required. A removable medium 611, such as a disk, a CD, a magnet-optical disk, and a semiconductor memory, is installed on the driver 610 as required, to facilitate the retrieval of a computer program from the removable medium and the installation into the storage section 608 as needed.

In one embodiment, the process described in the above flow chart may be implemented as a computer program according to the embodiments of the present disclosure. For example, the embodiments include a computer program product including a computer program which is provided in a medium readable by a computer and comprises program code for performing the method shown in the flow chart. In this embodiment, the computer program may be downloaded from the network and installed through the communication part 609 and/or installed from the removable medium 611.

In the accompanying drawings, the flow chart and the block diagrams illustrate the possible system architectures, functions and operations of the system, the method and the computer program product according to the various embodiments of the present invention. In this regard, each block in the flow charts and block diagrams may represent a module, a program section or a code portion. The module, the program section, or the code portion includes one or more executable instructions for implementing the prescribed logic functions. It should be noted that, in some alternative embodiments, the functions denoted by the blocks may also be executed in a sequence different from that shown in the drawings. For example, two blocks in succession may be executed substantially in parallel, or in a reverse order, depending on the functionalities involved. It should also be noted that, each block in the block diagram and/or in the flow chart and a combination thereof may be implemented by a dedicated hardware-based system executing specific functions or operations, or by a combination of a dedicated hardware and computer instructions.

The units described involved in the embodiments of the present application may be implemented in software or hardware. The described units may also be provided in a processor. For example, it may be described as a processor comprising a determining module, a grouping module, a training module and an identifying module. The names of those modules are not considered as the limitations to the modules in certain circumstances. For example, the determining module may also be described as "a module for determining virus families of each malicious file sample in the file samples."

In another aspect, the present disclosure further provides a storage medium readable by a computer which may be the computer readable medium contained in the apparatus in the above embodiments or may be an independent computer readable medium that has not been installed into the terminal. The computer readable storage medium has one or more programs stored therein which are executed by one or more processors to perform the method of identification file described in the present application.

The contents described above are embodiments of the present disclosure and explanation of the applied technical principles. It should be understood by the skilled in the art that the inventive scope of the present invention is not limited to the solution formed by the specific combination of the above technical features, but shall include other technical solutions formed by any combinations of the described technical features or their equivalents without departing from the described invention concept. For example, the features described above may be replaced by technical features with similar functions that are disclosed in the present application, but not limited to, to form a solution without departing from the scope of the invention.

The invention claimed is:

1. A method for file identification, the method comprising:
    determining a virus family of each malicious file sample in a plurality of file samples resulting in a plurality of virus families;
    dividing the plurality of virus families into sample groups based on a number of the malicious file samples belonging to each of the plurality of virus families, the sample groups including a light-class sample group, a middle-class sample group and a heavy-class sample group, the light-class sample group being ones of the plurality of virus families having a number of malicious file samples below a first threshold number of file samples, the heavy-class sample group being ones of the plurality of virus families having a number of malicious file samples above a second threshold number of file samples, and the middle-class sample group being ones of the plurality of virus families having a number of malicious file samples between or equal to the first threshold and the second threshold;

training the malicious file samples in each of the sample groups with a different training rule to obtain at least one file identification model;

determining, using the at least one identification model, whether a file is a malicious file;

detecting whether a number of newly added malicious files in a first sample group of the sample groups is larger than a preset threshold value;

training the malicious file samples and the newly added malicious files in the first sample group to obtain an updated file identification model, when the number of the newly added malicious files in the sample groups is larger than the preset threshold value;

replacing a current file identification model for the sample group with the updated file identification model.

2. The method as claimed in claim 1, wherein the training the malicious file samples in each of the sample groups with the different training rule to obtain the at least one file identification model comprises:

performing a feature vector training to the malicious file samples in the light-class sample group and a first group of non-malicious file samples to obtain a light-class file identification model;

performing a logic operation training to the malicious file samples in the middle-class sample group and a second group of non-malicious file samples to obtain a middle-class file identification model; and performing a combinatorial training with a plurality of sub-models to the malicious file samples in the heavy-class sample group and a third group of non-malicious file samples, wherein a set of the plurality of sub-models is considered as a heavy-class file identification model.

3. The method as claimed in claim 1, further comprising:

evaluating the updated file identification model and the current file identification model based on the file samples to obtain a first evaluating result and a second evaluating result;

evaluating the updated file identification model based on the files newly added in a predetermined period to obtain a third evaluating result; and replacing the current file identification model with the updated file identification model when the first evaluating result is superior to the second evaluating result and the third evaluating result satisfies a preset condition, wherein the evaluating result is a member selected from the group consisting of a detection rate and a false positive rate.

4. The method of claim 1, the first and second thresholds being determined based on a cumulative distribution function.

5. An apparatus for file identification comprising one or more processors, memory coupled to the one or more processors, the memory including program instructions stored thereon that, upon execution by the one or more processors, causes the apparatus to perform operations, the operations comprising:

a determining module configured to determine a virus family of each malicious file sample in a plurality of file samples resulting in a plurality of virus families;

a grouping module configured to divide the plurality of virus families into sample groups based on a number of the malicious file samples belonging to each of the plurality of virus families, the sample groups including a light-class sample group, a middle-class sample group and a heavy-class sample group, the light-class sample group being ones of the virus families having a number of malicious file samples below a first threshold number of file samples, the heavy-class sample group being ones of the virus families having a number of malicious file samples above a second threshold number of file samples, and the middle-class sample group being ones of the virus families having a number of malicious file samples between or equal to the first threshold and the second threshold;

a training module configured to train the malicious file samples in each of the sample groups with a different training rule to obtain at least one file identification model;

an identifying module configured to determine, using the at least one identification model, whether a file is a malicious file;

a detecting module configured to detect whether a number of newly added malicious files in a first sample group of the sample groups is larger than a preset threshold value;

a updating module configured to train the malicious file samples and the newly added malicious files in the first sample group to obtain an updated file identification model, when the number of the additional malicious files is larger than the preset threshold value; and a replacing module configured to replace a current file identification model for the first sample group by using the updated file identification model.

6. The apparatus as claimed in claim 5, wherein the training module comprises:

a first training unit configured to perform a feature vector training to the malicious file samples in the light-class sample group and a first group of non-malicious files to obtain a light-class file identification model;

a second training unit configured to perform a logical calculus training to the malicious file samples in the middle-class sample group and a second group of non-malicious file samples to obtain a middle-class file identification model; and a third training unit configured to perform a combinatorial training to the malicious file samples in the heavy-class sample group and a second group of non-malicious files, wherein a set of the plurality of sub-models is considered as a heavy-class file identifications model.

7. The apparatus as claimed in claim 5, further comprising:

a first evaluating module configured to evaluate the updated file identification model and the current file identification model respectively based on the file samples to obtain a first evaluating result and a second evaluating result; and a second evaluating module configured to evaluate the updated file identification model based on the newly added files in the preset period to obtain a third evaluating result, wherein the replacing module further configured to replace the current file identification model with the updated file identification model when the first evaluating result is superior to the second evaluating result and the third evaluating result satisfies the preset condition, and the evaluating result is a member selected from the group consisting of: a detection rate and a false positive rate.

8. The apparatus of claim 5, the first and second thresholds being determined based on a cumulative distribution function.

9. A computer device comprising a memory and a processor, the memory storing computer code, and the processor configured to execute the computer code to control the processor to:
determining a virus family of each malicious file sample in a plurality of file samples resulting in a plurality of virus families;
dividing the plurality of virus families into sample groups based on a number of the malicious file samples belonging to each of the plurality of virus families, the sample groups including a light-class sample group, a middle-class sample group and a heavy-class sample group,
the light-class sample group being ones of the virus families having a number of malicious file samples below a first threshold number of file samples,
the heavy-class sample group being ones of the virus families having a number of malicious file samples above a second threshold number of file samples, and
the middle-class sample group being ones of the virus families having a number of malicious file samples between or equal to the first threshold and the second threshold;
training the malicious file samples in each of the sample groups with a different training rule to obtain at least one file identification model;
determining, using the at least one identification model, whether a file is a malicious file;
detecting whether a number of newly added malicious files in a first sample group of the sample groups is larger than a preset threshold value;
training the malicious file samples and the newly added malicious files in the first sample group to obtain an updated file identification model, when the number of the newly added malicious files in the sample groups is larger than the preset threshold value;
replacing a current file identification model for the first sample group with the updated file identification model.

10. The computer device as claimed in claim 9, wherein the training the malicious file samples in each of the sample groups with the different training rule to obtain the at least one file identification model comprises:
performing a feature vector training to the malicious file samples in the light-class sample group and a first group of non-malicious file samples to obtain a light-class file identification model;
performing a logic operation training to the malicious file samples in the middle-class sample group and a second group of non-malicious file samples to obtain a middle-class file identification model; and performing a combinatorial training with a plurality of sub-models to the malicious file samples in the heavy-class sample group and a third group of non-malicious file samples, wherein a set of the plurality of sub-models is considered as a heavy-class file identification model.

11. The computer device as claimed in claim 9, the processor further configured to execute the computer code to control the processor to:
evaluating the updated file identification model and the current file identification model based on the file samples to obtain a first evaluating result and a second evaluating result;
evaluating the updated file identification model based on the files newly added in a predetermined period to obtain a third evaluating result; and
replacing the current file identification model with the updated file identification model when the first evaluating result is superior to the second evaluating result and the third evaluating result satisfies a preset condition,
wherein the evaluating result is a member selected from the group consisting of a detection rate and a false positive rate.

12. The computer device of claim 9, the first and second thresholds being determined based on a cumulative distribution function.

13. A non-transitory computer readable storage medium, including computer code, which, when executed by a processor, causes the processor to:
determine a virus family of each malicious file sample in a plurality of file samples resulting in a plurality of virus families;
divide the plurality of virus families into sample groups based on a number of the malicious file samples belonging to each of the plurality of virus families, the at least one sample group including a light-class sample group, a middle-class sample group and a heavy-class sample group,
the light-class sample group being ones of the virus families having a number of malicious file samples below a first threshold number of file samples,
the heavy-class sample group being ones of the virus families having a number of malicious file samples above a second threshold number of file samples, and
the middle-class sample group being ones of the virus families having a number of malicious file samples between or equal to the first threshold and the second threshold;
train the malicious file samples in each of the sample groups with a different training rule to obtain at least one file identification model;
determine, using the at least one identification model, whether a file is a malicious file;
detect whether a number of newly added malicious files in a first sample group of the sample groups is larger than a preset threshold value;
train the malicious file samples and the newly added malicious files in the first sample group to obtain an updated file identification model, when the number of the newly added malicious files in the sample groups is larger than the preset threshold value; and,
replace a current file identification model for the first sample group with the updated file identification model.

14. The non-transitory computer readable storage medium as claimed in claim 13, wherein the computer code configured to cause the processor to train the malicious file samples in each of the sample groups with the different training rule to obtain the at least one file identification model by:
- performing a feature vector training to the malicious file samples in the light-class sample group and a first group of non-malicious file samples to obtain a light-class file identification model;
- performing a logic operation training to the malicious file samples in the middle-class sample group and a second group of non-malicious file samples to obtain a middle-class file identification model; and
- performing a combinatorial training with a plurality of sub-models to the malicious file samples in the heavy-class sample group and a third group of non-malicious file samples, wherein a set of the plurality of sub-models is considered as a heavy-class file identification model.

15. The non-transitory computer readable storage medium as claimed in claim 13, the computer code configured to cause the processor to:

- evaluate the updated file identification model and the current file identification model based on the file samples to obtain a first evaluating result and a second evaluating result;
- evaluate the updated file identification model based on the files newly added in a predetermined period to obtain a third evaluating result; and
- replace the current file identification model with the updated file identification model when the first evaluate result is superior to the second evaluate result and the third evaluate result satisfies a preset condition,
- wherein the evaluate result is a member selected from the group consisting of a detection rate and a false positive rate.

16. The non-transitory computer readable storage medium of claim 13, the first and second thresholds being determined based on a cumulative distribution function.

* * * * *